United States Patent [19]

Lehner et al.

[11] Patent Number: 4,671,969

[45] Date of Patent: Jun. 9, 1987

[54] PRODUCTION OF LAYER-TYPE MAGNETIC RECORDING MEDIA

[75] Inventors: August Lehner, Roedersheim-Gronau; Werner Balz, Limburgerhof; Werner Lenz, Bad Durkheim; Albert Kohl, Laumersheim; Guenter Heil, Ludwigshafen, all of Fed. Rep. of Germany

[73] Assignee: BASF Aktiengesellschaft, Fed. Rep. of Germany

[21] Appl. No.: 759,170

[22] Filed: Jul. 26, 1985

[30] Foreign Application Priority Data

Jul. 27, 1984 [DE] Fed. Rep. of Germany ....... 3427685

[51] Int. Cl.$^4$ .............................................. H01F 10/02
[52] U.S. Cl. ...................................... 427/48; 427/44; 427/54.1; 427/128; 427/130
[58] Field of Search ................ 427/48, 44, 132, 154.1, 427/127–131; 428/694, 900

[56] References Cited

FOREIGN PATENT DOCUMENTS

| | | |
|---|---|---|
| 3005036 | 8/1981 | Fed. Rep. of Germany . |
| 116963 | 3/1974 | German Democratic Rep. . |
| 116248 | 11/1975 | German Democratic Rep. . |
| 1497657 | 1/1978 | United Kingdom . |
| 1497656 | 1/1978 | United Kingdom . |
| 1497658 | 1/1978 | United Kingdom . |

OTHER PUBLICATIONS

Marketing Corp., Stanford, USA 1978.
Atomic Radiation & Polymers; Charlesby, Pergamon Press, 1960 S 368–394 S. 426–440.

*Primary Examiner*—Bernard D. Pianalto
*Attorney, Agent, or Firm*—Keil & Weinkauf

[57] ABSTRACT

Layer-type magnetic recording media are produced by dispersing a finely divided magnetically anisotropic material in a binder which consists of not less than 40% of a radiation-curable aqueous binder dispersion, applying the dispersion onto a non-magnetic base, orienting the magnetically anisotropic material and drying and crosslinking the applied layer by means of UV or high-energy electron radiation.

9 Claims, No Drawings

PRODUCTION OF LAYER-TYPE MAGNETIC RECORDING MEDIA

The present invention relates to a process for the production of layer-type magnetic recording media, comprising a non-magnetic base and, applied onto this, one or more magnetizable layers consisting of anisotropic magnetic material finely dispersed in an organic binder, with the use of a radiation-curable aqueous binder dispersion.

Because of developments in the field of magnetic sound, image and data storage, the magnetic recording media have to meet constantly increasing requirements, while at the same time the desire to use this techology widely has meant that the reliability of these media has to be constantly increased. For example, higher recording densities frequently require the production of thinner magnetic layers in all of the stated application forms. For this reason, the packing density of the magnetic material in the magnetic layer, the residual induction in the recording direction, the uniform distribution of the magnetic material in the layer and the surface smoothness and homogeneity of the layer have to be improved. All these requirements, which the magnetic layer has to meet while exhibiting increased recording density, being free from errors and having a constant output level, can be influenced to a considerable extent by the type of binder used. It is important that the binder thoroughly wets the magnetic material so that homogeneous dispersing in the layer is achieved, possesses good flow and film-forming properties, resulting in a satisfactory surface of the magnetic layer, and imparts to the magnetic layer the mechanical stability appropriate for the load.

In order to produce magnetic recording media of this type, the conventional layers containing the magnetic material were predominantly produced with the aid of highly polymeric, solvent-containing, physically drying or chemically crosslinkable binders or binder mixtures. The solvents used were, for example, methyl ethyl ketone, methyl isobutyl ketone, ethyl acetate, butyl acetate, methanol, ethanol, propanol, butanol, toluene, xylene, tetrahydrofuran and dioxane. The pollutant properties, in particular flammability and toxicity, of these solvents and the relatively high price are disadvantages. For these reasons, it has long been regarded as necessary to work in closed systems and to circulate the solvent via a recovery unit, which has to be installed additionally.

Since the physically drying binders no longer adequately meet the demands made on high quality recording media, it has also been proposed to crosslink high molecular weight thermoplastic binders with, for example, polyisocyanates. The disadvantages of such a procedure are that the crosslinking reactions are very sensitive to temperature effects and moisture contents, and this type of crosslinking requires exact metering of the components. Furthermore, in this procedure the crosslinking agent, with all its undesirable side effects, remains in the magnetic layer; an attempt has therefore also been made to use radiation-curable binders, e.g. butadiene/acrylonitrile (U.S. Pat. No. 3,104,983) and mixtures of high molecular weight thermoplastic polymers and polyfunctional acrylate prepolymers (WO 82/01099). The use of organic solvents is also a disadvantage here.

On the other hand, the use of aqueous polymer dispersions in the preparation of the dispersions of magnetic materials which are suitable for the manufacture of magnetic recording media has been proposed. For example, German Laid-Open Applications DOS 2,513,421 and DOS 2,513,422 describe aqueous polymer dispersions based on crosslinkable vinyl acetate or acrylate polymers and melamine/formaldehyde. However, the assistants, such as protective colloids, thickeners or emulsifiers, which are required for the preparation of these dispersions result in foam formation during the preparation of the dispersions of the magnetic materials and give magnetic layers exhibiting a greater tendency to smearing. East German Pat. No. 116,963, too, describes the production of magnetic layers using aqueous dispersions. However, the binders used give layers which are sensitive to moisture, tend to stick and to smear and have surfaces which are not very abrasion resistant. The use of crosslinked cationic polyurethanes for coating leather and textiles and also for the production of magnetic layers is proposed in East German Pat. No. 116,248. However, the disadvantage here is that even small differences in pH between the magnetic material and the binder cause the stated polyurethane to undergo crosslinking or partially coagulate, with the result that the processibility of the magnetic dispersion and the quality of the recording medium are adversely affected.

It is an object of the present invention to utilize the known advantages of aqueous polymer dispersions to produce layer-type magnetic recording media with the aid of radiation-curable aqueous binders, in which the disadvantages described do not occur, ie. the recording media are not sensitive to moisture, do not tend to stick, exhibit little abrasion of the layer and possess an extremely smooth surface coupled with advantageous behavior with regard to errors.

We have found that this object is achieved, and that layer-type magnetic recording media can be produced, by dispersing a finely divided magnetically anisotropic material in a binder which consists of not less than 40% of a radiation-curable aqueous binder dispersion, applying the dispersion onto a non-magnetic base, orienting the magnetically anisotropic material and drying and crosslinking the applied layer, if the radiation-curable aqueous binder dispersion essentially consists of (A) from 5 to 80% by weight of water and
(B) from 95 to 20% by weight of a polymerizable thioether adduct of a polymerizable oligomer or polymer which is dispersed in (A) and has a mean molecular weight of not less than 350, a content of salt groups of from 0.4 to 12% and a content of from 0.01 to 0.8 mole of polymerizable C—C double bonds per 100 g of oligomer or polymer, the crosslinked unpigmented polymer film having an elongation greater than 10%, a tensile strength greater than 10 N/mm$^2$ and a modulus of elasticity greater than 100 N/mm$^2$.

The polymerizable binder (B) is generally obtained by an addition reaction of a mercaptocarboxylic acid with water-insoluble polymerizable oligomers or polymers which contain two or more C—C double bonds per molecule.

Preferred radiation-curable oligomers or polymers are polymerizable polyesters which contain C—C double bonds and have an acid number no higher than 10, polymerizable polyethers containing C—C double bonds, hydroxyl-containing reaction products of a polyepoxide containing two or more epoxide groups per molecule with one or more α- and/or β-ethylenically unsaturated carboxylic acids, polyurethane (meth)acrylates and acryl copolymers containing α- and/or β-ethylenically unsaturated acyl radicals.

The preparation of these radiation-curable aqueous binder dispersions is known per se (German Laid-Open DOS Application DOS 3,005,036).

Suitable starting materials for producing the radiation-curable aqueous binder dispersions are the following:

(A) Component (A) is water, which is present in an amount of from 5 to 80, preferably from 20 to 80, % by weight.

(B) Component (B) is a thioether adduct which has a content of polymerizable double bonds of from 0.01 to 0.8, preferably from 0.04 to 0.6, mole per 100 g of substance and a mean molecular weight of not less than 350. The radiation-curable oligomers or prepolymers from which the thioether adduct is derived can be, for example, 1. a polyester which has an acid number of not more than 10 and is obtained from aliphatic and/or aromatic dicarboxylic acids, such as succinic acid, glutaric acid, adipic acid, pimelic acid, suberic acid, azelaic acid, sebacic acid, cyclohexane dicarboxylic acid, phthalic acid, isophthalic acid, terephthalic acid, maleic acid, fumaric acid or itaconic acid or their esterifiable derivatives, and polyhydric alcohols, such as ethylene glycol, polyethylene glycols, propylene glycol, polypropylene glycols, butanediol, hexanediol, neopentylglycol, neopentylglycol hydroxypivalate, trimethylolpropane, glycerol, pentaerythritol and/or trishydroxyethyl isocyanurate, and α- and/or β-ethylenically unsaturated monocarboxylic acids, for example acrylic acid, methacrylic acid, crotonic acid or cinnamic acid, and/or dicarboxylic half esters of monoalchols, such as maleic, fumaric and itaconic half esters of $C_1$–$C_4$-monoalcohols, acrylic acid and methacrylic acid being preferred, and which can be prepared by a conventional process in one stage or stepwise, 2. an aliphatic or araliphatic polyether which is obtained by reacting dihydric and/or polyhydric alcohols, as stated under (1), with various amounts of ethylene oxide and/or propylene oxide, and some or all of whose free hydroxyl groups are etherified with ethylenically unsaturated alcohols, eg. allyl alcohol, methallyl alcohol, crotyl alcohol or cinnamyl alcohol, and/or esterified with α- and/or β-ethylenically unsaturated monocarboxylic acids as stated under (1), 3. an unsaturated hydroxyl-containing compound which can be prepared by reacting a polyepoxide having on average two or more epoxide groups per molecule, for example polyglycidyl ethers of polyhydric alcohols, as stated under (1), polyglycidyl ethers of polyhydric phenols, such as bisphenol A, glycidyl esters of polybasic carboxylic acids, as stated under (1), other glycidyl compounds, e.g. triglycidyl isocyanurate, and/or epoxidized natural or synthetic oils with α- and/or β-ethylenically unsaturated carboxylic acids, as stated under (1), 4. a polyurethane which may or may not contain urea groups and can be prepared from aliphatic and/or aromatic polyisocyanates, eg. tetramethylene diisocyanate, hexamethylene diisocyanate, isophorone diisocyanate, diphenyl methane diisocyanate, toluylene diisocyanate, naphthylene diisocyanate or 4,4′-diphenyl ether diisocyanate, dimers or trimers which may be obtained from these, and their reaction products with minor amounts of compounds possessing active hydrogen atoms, for example polyhydric alcohols, as stated under (1), polyfunctional amines and/or amino alcohols, by reaction with hydroxyl-containing (meth)acrylates, such as hydroxyethyl (meth)acrylate, hydroxypropyl (meth)acrylate and/or butanediol (meth)acrylate, 5. a polymer which can be obtained by introducing α- and/or β-ethylenically unsaturated acrylates, which are derived from, for example, the α- and/or β-ethylenically unsaturated monocarboxylic acids stated under (1), into acrylate copolymers, styrene/acrylate polymers or the like, prepared by conventional solution polymerization, having a content of not less than 0.02 mole of hydroxyl, carboxyl and/or epoxide groups per 100 g of substance, and 6. a polyurethane (urea) which is prepared from polyisocyanates, organic polyhydroxy compounds having a molecular weight of from 400 to 5,000, acrylate diols having molecular weights of from 146 to 3,000 and, if desired, diols or triols having a molecular weight of from 62 to 400, the NCO/OH ratio being from 0.5:1 to 1.3:1.

Mixtures of the oligomers and polymers (prepolymers) stated under (1) to (6) are also suitable.

Component (B) is prepared from the radiation-curable oligomers or polymers by reacting these with mercapto-containing carboxylic acids or their salts, or mixtures of these. This reaction is carried out at from 0° to 120° C., preferably from 20° to 100° C., the components being stirred in the presence or absence of a solvent, eg. acetone or tetrahydrofuran.

Suitable mercaptocarboxylic acids are all carboxylic acids which carry a mercapto group, in particular those in which the mercapto group is α or β to the acid group. The mercapto acids can be aliphatic, cycloaliphatic, araliphatic or aromatic, examples being mercaptoacetic acid, mercaptopropionic acid, mercaptobutyric acid, mercaptoisobutyric acid, mercaptolinoleic acid, mercaptotrimethylacetic acid, mercaptocyclohexanoic acid, mercaptophenylacetic acid, mercaptobenzoic acid, mercaptotoluylic acid and mercaptochlorobenzoic acid. Reaction products of mercaptoethanol with poly- or dicarboxylic anhydrides, for example with succinic anhydride, maleic anhydride, phthalic anhydride or trimellitic anhydride, are also suitable if the SH group remains free. Mercapto-acetic acid is particularly preferred.

Examples of suitable compounds for converting the mercaptocarboxylic acids to their salt form are:

1. organic bases, such as monofunctional primary, secondary or tertiary amines, eg. methylamine, diethylamine, trimethylamine, triethylamine, ethylamine, tributylamine, pyridine, methylethylamine, diethylmethylamine, aniline or toluidine, oxyalkylated amines, e.g. ethanolamine, diethanolamine, triethanolamine, methyldiethanolamine or oleyldiethanolamine, and polyfunctional amines in which the individual amino groups may possess different basicity, eg. N,N-dimethylethylenediamine, α-aminopyridine or N,N-dimethylhydrazine, amines having a boiling point of less than 120° C., eg. trimethylamine and triethylamine, being preferred; and 2. inorganic bases, or compounds which have a basic reaction or eliminate bases, eg. ammonia and monovalent metal hydroxides, carbonates and oxides, such as sodium hydroxide or potassium hydroxide; preferred compounds are ammonium, potassium hydroxide and sodium hydroxide.

In developing the novel process, it was also found to be advantageous if the radiation-curable aqueous binder dispersions are combined with aqueous binder dispersions which are not radiation-curable. In general, mixtures of from 40 to 95% of radiation-curable dispersions and from 5 to 60% of dispersions which are not radiation-curable are suitable for this purpose.

The magnetic recording media are produced in a conventional manner.

Magnetic pigments which can be used are the conventional ones, these pigments of course playing a role in determining the properties of the resulting magnetic layers. Examples of suitable magnetic pigments are gamma-iron(III) oxide, finely divided magnatite, undoped or doped ferromagnetic chromium dioxide, cobalt-doped gamma-iron(III) oxide and ferromagnetic metals and metal alloy pigments, such as alloys of iron and cobalt (prepared, for example, as described in German Pat. No. 1,247,026). Preferred magnetic pigments are acicular gamma-iron(III) oxide and ferromagnetic chromium dioxide. The particle size is in general from 0.2 to 2 μm, preferably from 0.3 to 0.8 μm.

In a conventional manner, the magnetic layers may furthermore contain small amounts of additives such as dispersants and/or lubricants, as well as fillers, which are mixed in during dispersing of the magnetic pigments or during the production of the magnetic layer. Examples of such additives are fatty acids or isomerized fatty acids, such as stearic acid or its salts with metals of main groups 1 to 4 of the Periodic Table of Elements, amphoteric electrolytes, such as lecithin, and fatty acid esters or waxes, silicone oils, carbon black, etc. A particularly advantageous dispersant is prepared from 25-85% of a polyether acrylate having from 2 to 10 ether groups per double bond and 15-75% of acrylic acid or methacrylic acid. The additives are used in a conventional amount, in general in an amount of less than 10% by weight, based on the magnetic layer.

The ratio of magnetic pigment to binder in the novel recording materials is in general from 1 to 10, in particular from 3 to 6, parts by weight of magnetic pigment to 1 part by weight of the binder or binder mixture. A particular advantage resulting from the excellent pigment-binding capacity of the aqueous binder dispersions is that high magnetic pigment concentrations in the magnetic layers are possible without the mechanical properties being adversely affected or the performance characteristics suffering noticeably.

Suitable non-magnetic and non-magnetizable bases are the conventional rigid or flexible bases, in particular films of linear polyesters, such as polyethylene terephthalate, in general from 4 to 200 μm, in particular from 6 to 36 μm, thick. Recently, the use of magnetic layers on paper bases for electronic computing and accounting machines has also become important; the novel coating materials can also advantageously be used for this purpose.

To produce the magnetic recording media, a magnetic dispersion is prepared in a dispersing machine, eg. a steel ball mill or a stirred ball mill, from the magnetic pigment and the aqueous binder dispersion, with the addition of dispersants and other additives, and the dispersion is filtered and then applied onto the base by means of a conventional coating machine, for example a knife coater. As a rule, magnetic orientation is effected before the liquid coating mixture is dried on the base, this procedure advantageously taking place for from 2 to 5 minutes at from 60° to 120° C. The magnetic layers are then calendered and compacted on conventional machines by being passed between heated and polished rollers, if necessary under pressure and at from 50° to 100° C., preferably from 60° to 80° C. The thickness of the magnetic layer is in general from 0.5 to 20 μm, preferably from 1 to 10 μm. Curing of the magnetic layers is then effected by exposing them for a short time to UV or high-energy electron radiation. This is done using the UV or electron radiation sources usually employed for curing coatings, as described in, for example, UV Curing: Science and Technology, editor S. Peter Pappas, Technology Marketing Corporation, Stanford, USA, 1978, and Atomic Radiation and Polymers, Charlesby, Pergamon Process, 1960.

Compared with magnetic recording media produced using prior art binders, these magnetic recording media prepared according to the invention possess improved homogenity of the magnetic layer. Because the latter is both uniform and homogeneous, the novel magnetic recording media produce substantially fewer errors. The improved abrasion resistance and reduced moisture sensitivity of the magnetic recording media produced according to the invention are also noteworthy. These advantages can furthermore be obtained using a binder system which avoids the known disadvantages and risks involved in the use of organic solvents. Further advantages of the novel process are the high thermoplasticity which the special binders employed exhibit prior to curing, with the result that good films, ie. an excellent surface of the layer, can be produced, the mechanical strength of which can be substantially improved by the final curing procedure.

EXAMPLE A 300 g of a polyester, having a molecular weight of 1,000 and prepared from adipic acid and butane-1,4-diol, together with 22.5 g of butane-1,4-diol, 3.47 g of trimethylolpropane, 262 g of bisphenol A diglycidyl ether diacrylate (dissolved in 112 g of acetone) and 350 g of 4,4'-diphenylmethane diisocyanate, were dissolved in 821 g of tetrahydrofuran, 1.88 g of 2,6-di-tert.-butyl-4-methylphenol and 15 drops of dibutyl-tin dilaurate were added, and the mixture was then stirred at 60° C. until the NCO content was 1.6%. A mixture of 69 g of 80% strength mercaptoacetic acid, 60.6 g of triethylamine and 31.2 g of water was then added in the course of 2 minutes. After a reaction time of 30 minutes, 1,600 g of water were added and the organic solvent was removed by distillation to give a stable dispersion.

EXAMPLE B 208 g of a polycaprolactone having an OH number of 135, together with 135 g of butane-1,4-diol, 183 g of bisphenol A diglycidyl ether diacrylate (dissolved in 75 g of acetone) and 181.3 g of 4,4'-diphenylmethane diisocyanate, were dissolved in 512 g of tetrahydrofuran, 0.12 g of 2,6-di-tert.-butyl-4-methylphenol and 20 drops of dibutyl-tin dilaurate were added, and the mixture was then stirred at 60° C. until no NCO groups were present. A mixture of 29 g of 80% strength mercaptoacetic acid, 25 g of triethylamine and 13 g of acetone was then added in the course of 2 minutes. After a reaction time of 30 minutes, 900 g of water were added and the organic solvent was removed by distillation to give a stable dispersion.

EXAMPLE C 300 g of a polyester, having a molecular weight of 1,000 and prepared from adipic acid and butane-1,4-diol, together with 22.5 g of butane-1,4-diol, 4.47 g of trimethylolpropane, 262 g of bisphenol A diglycidyl ether diacrylate (dissolved in 112 g of acetone) and 350 g of 4,4'-diphenylmethane diisocyanate, were dissolved in 821 g of tetrahydrofuran, 1.88 g of 2,6-di-tert.-butyl-4-methylphenol and 15 drops of dibutyl-tin dilaurate were added, and the mixture was then stirred at 60° C. until the NCO content was 1.6%. A mixture of 115 g of 80% strength mercaptoacetic acid, 101 g of triethylamine and 52 g of acetone was then added in the course of 2 minutes. After a reaction time of 30 minutes, 1,600 g of water were added and the organic solvent was removed by distillation to give a stable dispersion.

EXAMPLE 1

6,000 parts of an $\gamma$-$Fe_2O_3$ having a coercive force of 26.5 kA/m in an aqueous ammoniacal solution of 400 parts of 30% strength sodium polyacrylate, 150 parts of a 20% strength solution of sodium polyphosphate, 50 parts of 10% strength ammonia, 45 parts of a commercial dispersant based on salts of fatty acids and 3,750 parts of water were dispersed for 40 hours in a ball mill having a capacity of 30 l and charged with 40 kg of steel balls of 4–6 mm diameter.

3,750 parts of the binder dispersion of Example A were then added, and dispersing was continued for a further 30 minutes.

The resulting dispersion of magnetic material was filtered through a paper filter having a pore size of 5 $\mu$m, after which a 12 $\mu$m thick polyethylene terephthalate film was coated with the dispersion by means of a conventional knife coater. The coated film was passed through a homogeneous magnetic field in order to orient the gamma-iron(III) oxide particles and was then dried at from 80° to 120° C. Thereafter, the layer was calendered at 60° C. and under a nip pressure of 23 $N/mm^2$. The thickness of the magnetic layer was 5.0±0.3 $\mu$m. The coated film was then cured in an electron beam unit (accelaration voltage 160 kV) with a curing dose of 7 Mrad.

Tapes slit to a width of 3.81 mm had electroacoustic properties conforming to the IEC I standard. The results of the mechanical measurements in the tests below are shown in the Table.

TEST 1

Coefficient of Friction (Layer/Steel, before/after Continuous Operation)

The coefficients of friction are determined in accordance with DIN 45,522, sheet 1, on the unused tape and on a tape which has been subjected to continuous use.

TEST 2

Quasistatic Friction

The coefficient of friction is determined by measuring the tensile force which is produced as a result of friction generated by magnetic tape passing over a fixed graduated drum. The latter is a steel drum having a surface roughness of about 0.15 $\mu$m and a diameter of 70 mm. The piece of tape is 25 cm long and is fed over the drum under a tape tension of 20 cN at a rate of 1 mm/sec and at an angle of wrap of 180°. The tension at the load cell, F, is a measure of the coefficient of friction $\mu$, the relative expression being $\mu = 1 \cdot \text{Ln } F$.

TEST 3

Dynamic Friction

The relevant coefficient of friction is measured using a procedure similar to that for Test 2, except that the graduated drum rotates at a speed of 9.5 cm/sec.

TEST 4

Abrasion during Continuous Operation

This measurement is used to assess the abrasion properties of a tape. The abrasion is measured in the form of the weight loss of a tape loop, in mg. The length of the loop is 95 cm, the speed 4 m/sec, the tape tension 35 cN and the running time 1 hour, the test being carried out at an ambient temperature of 23° C. and a relative humidity of 50%.

EXAMPLE 2

The procedure described in Example 1 was followed, except that the binder dispersion of Example A was replaced by that of Example B. The test results are shown in the Table.

COMPARATIVE EXPERIMENT

The procedure described in Example 1 was followed, except that the binder dispersion of Example A was replaced with that of Example C. Furthermore, when this binder is used, the magnetic layer is not cured by radiation. The test results are shown in the Table.

TABLE

|  | Example 1 | Example 2 | Comparative experiment |
|---|---|---|---|
| Layer thickness [$\mu$m] | 5.2 | 5.7 | 5.5 |
| Test 1 | 0.24/0.26 | 0.22/0.45 | 0.44/0.60 |
| Test 2 | 0.13 | 0.12 | 0.14 |
| Test 3 | 0.30 | 0.24 | 0.36 |
| Test 4 | 0.1 | 0.1 | 0.2 |

We claim:
1. A process for the production of a layer-type magnetic recording medium by dispersing a finely divided magnetically anisotropic material in a binder which consists of not less than 40% of a radiation-curable aqueous binder dispersion, applying the dispersion onto a non-magnetic base, orienting the magnetically anisotropic material and drying and crosslinking the applied layer, wherein the radiation-curable aqueous binder dispersion essentially consists of
   (A) from 5 to 80% by weight of water and
   (B) from 95 to 20% by weight of a polymerizable thioether adduct of a polymerizable oligomer or polymer which is dispersed in (A) and has a mean molecular weight of not less than 350, a content of salt groups of from 0.4 to 12% and a content of from 0.01 to 0.8 mole of polymerizable C—C double bonds per 100 g of oligomer or polymer,
the crosslinked unpigmented polymer film having an elongation greater than 10%, a tensile strength greater than 10 N/mm$^2$ and a modulus of elasticity greater than 100 N/mm$^2$.

2. The process of claim 1, wherein the component (B) is obtained by an addition reaction of a mercaptocarboxylic acid with a water-insoluble polymerizable oligomer or polymer which contains two or more C—C double bonds per molecule.

3. The process of claim 1, wherein the component (B) is obtained by an addition reaction of a secondary amine with a water-insoluble polymerizable oligomer or polymer which contains two or more 2 C—C double bonds per molecule.

4. The process of claim 1, wherein a reaction product obtained by introducing α- and/or β-ethylenically unsaturated acrylyl radicals into an acrylate polymer is used as the water-insoluble oligomer or polymer for the preparation of component (B).

5. The process of claim 2, wherein a polyurethane (meth)acrylate which may or may not contain urea groups is used as the oligomer or polymer for the preparation of component (B).

6. The process of claim 1, wherein component (B) is a thioether adduct which has a molecular weight of from 1,000 to 50,000, a carboxyl content of from 0.5 to 16% and a content of from 0.01 to 0.5 mole of double bonds per 100 g of adduct and is obtained by reacting a urethane acrylate, which may or may not contain urea groups, with a salt of a mercaptocarboxylic acid.

7. The process of claim 1, wherein a polyether containing polymerizable C—C double bonds is used as the polymerizable oligomer or polymer for the preparation of component (B).

8. The process of claim 1, wherein a hydroxyl-containing reaction product of a polyepoxide containing two or more epoxide groups per molecule with one or more α- and/or β-ethylenically unsaturated carboxylic acids is used as the oligomer or polymer for the preparation of component (B).

9. The process of claim 1, wherein component (B) consists of from 40 to 95% of a radiation-curable dispersion and from 5 to 60% of a dispersion which is not radiation-curable.

* * * * *